US006966690B2

(12) United States Patent
Yen

(10) Patent No.: US 6,966,690 B2
(45) Date of Patent: Nov. 22, 2005

(54) FRUIT/VEGETABLE BLENDER HAVING MULTI-SPEED CONTROL SWITCH

(76) Inventor: Jen Yen Yen, 235 Chung-Ho Box 8-24, Taipei (TW)

( * ) Notice: Subject to any disclaimer, the term of this patent is extended or adjusted under 35 U.S.C. 154(b) by 63 days.

(21) Appl. No.: 10/788,012

(22) Filed: Feb. 27, 2004

(65) Prior Publication Data

US 2005/0190644 A1    Sep. 1, 2005

(51) Int. Cl.[7] .................... B02C 25/00; B01F 15/00; B01F 7/00

(52) U.S. Cl. ...................... 366/206; 366/601

(58) Field of Search ............... 366/206, 601, 366/199, 197, 205, 314; 99/348; 200/293, 200/302.1

(56) References Cited

U.S. PATENT DOCUMENTS

| | | | | |
|---|---|---|---|---|
| 3,299,226 A | * | 1/1967 | Edwards | 366/601 |
| 3,548,280 A | * | 12/1970 | Cockroft | 366/601 |
| 3,943,421 A | * | 3/1976 | Shibata et al. | 366/206 |
| 6,499,873 B1 | * | 12/2002 | Chen | 366/197 |
| 6,588,322 B2 | * | 7/2003 | Pavlovic et al. | 366/206 |

* cited by examiner

Primary Examiner—Tony G. Soohoo

(57) ABSTRACT

A fruit/vegetable blender having a multi-speed control switch comprises a speed controller mounted on the motor house thereof, for controlling power on/off and motor speed. The speed controller utilizes a variable resistor, a flexible conducting-plate, a conducting slider, a push button, a slider handle and a plurality of conducting ports along the variable resistor to provide a resistance adjusting mechanism, thereby the motor speed changing accordingly. The multi-speed control switch is further protected by an inner retaining plate, an outer retaining plate, a wavy plate and a water-resistant pad from water infiltration.

1 Claim, 2 Drawing Sheets

FRUIT/VEGETABLE BLENDER HAVING MULTI-SPEED CONTROL SWITCH

FIELD OF THE INVENTION

The present invention relates to fruit/vegetable blenders, more particularly to a fruit/vegetable blender having a multi-speed control switch and a water-resistant mechanism.

DESCRIPTION OF THE PRIOR ART

Restricted by the problem of water infiltration, the speed control switches for a fruit/vegetable blender of the prior art are a panel including a plurality of buttons respectively corresponding to different rotational speeds. It is common that the conventional speed control switches consist of three speed selecting buttons, respectively for high, middle and low speed, and a power switch. Therefore, the conventional speed control switch cannot have many speed options, and, further, the push buttons may fail after being used for an extended period of time.

SUMMARY OF THE INVENTION

Accordingly, the present invention as fruit/vegetable blender having a multi-speed control switch comprises a switching means for controlling rotational speed. The switching means has a circuit board, a variable resistor and a flexible conducting plate, which can not only control the power on/off but also slidably position the resistor to a suitable resistance so as to select a preferred rotational speed.

The fruit/vegetable blender having a multi-speed control switch further includes a water-resistant means for preventing water infiltration into the motor housing base. The means includes a water-resistant pad, a wavy plate, an inner retaining plate and an outer retaining plate.

DETAILED DESCRIPTION OF THE PREFERRED EMBODIMENT

Figure 1:
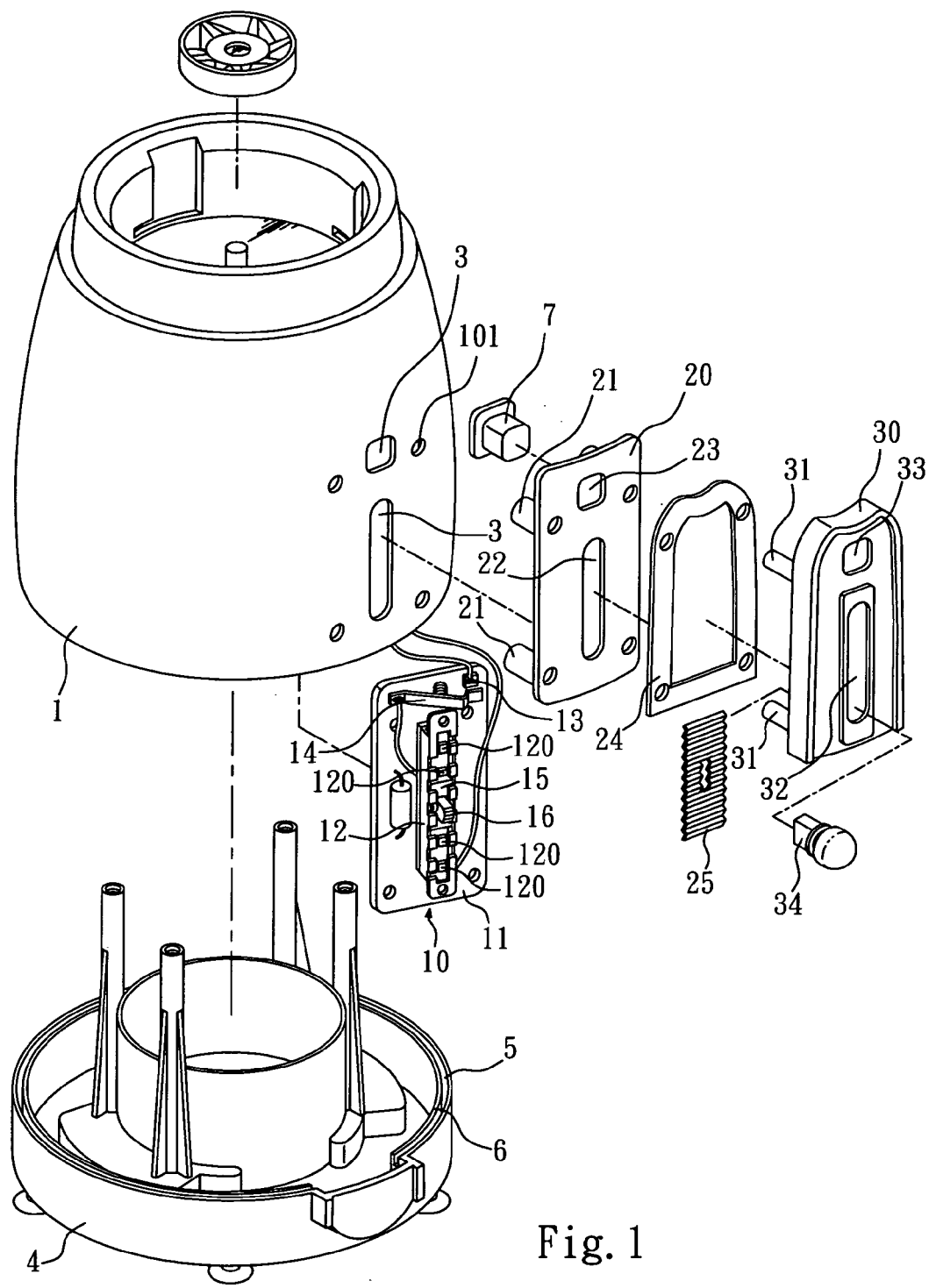
FIG. 1 is an exploded perspective view of the motor base of a fruit/vegetable blender having a multi-speed control switch according to the present invention.
Figure 2:
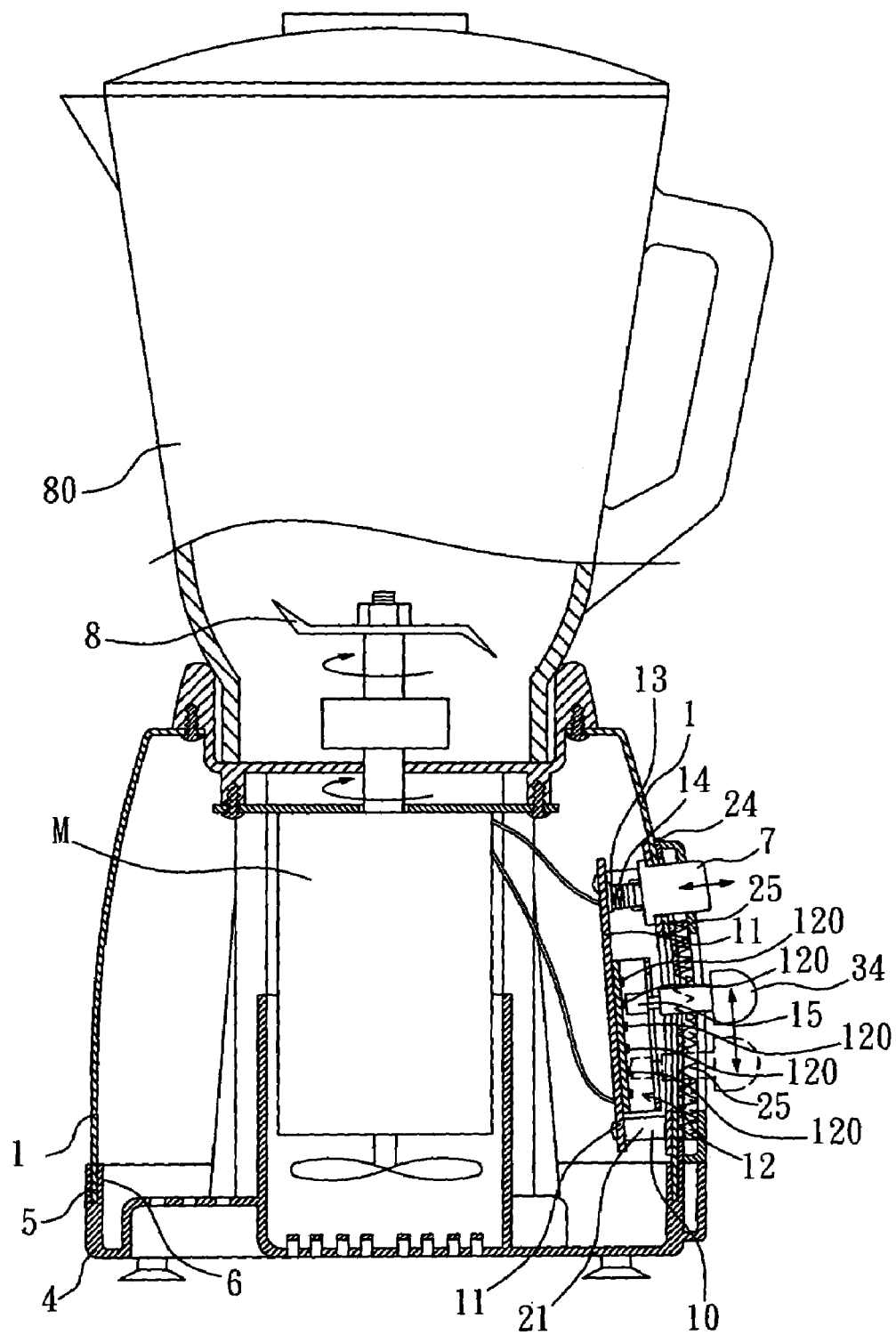
FIG. 2 is a cross-sectional view of a fruit/vegetable blender having a multi-speed control switch according to the present invention.

Referring to FIGS. 1 and 2, a fruit/vegetable blender having a multi-speed control switch according to the present invention comprises a motor house 1, a base 4, an inner retaining plate 20, a water-resistant pad 24, an outer retaining plate 30, a wavy plate 25 and a speed controller 10. A motor M is housed within the motor house 1 and is integrally mounted on the base 4.

The motor house 1 is made of stainless steel and is provided with a slot 2, a through hole 3 and a plurality of insertion holes 101 for retaining parts of the speed control switch. The through hole 3 is for receiving a push button 7.

The base 4 is provided with an inner wall 5 that is concentric with the inner rim thereof, so as to form a ring groove 6 for being coupled to the bottom end of the motor house 1.

The inner retaining plate 20 is attached to the inner wall of the motor house 1 and is provided with hollow positioning tubes 21, a through hole 23 and a sliding slot 22. The through hole 23 and the sliding slot 22 respectively correspond to the slot 2 and the through hole 3 of the motor house 1.

The outer retaining plate 30 is attached to the outer wall of the motor house 1 and is provided with solid positioning posts 31 capable of being respectively inserted into the hollow positioning tubes 21 of the inner retaining plate 20. The outer retaining plate 30 further includes a through hole 33 and a sliding slot 32, respectively corresponding to the slot 2 and the through hole 3 of the motor house 1.

The water-resistant pad 24 is sandwiched by the outer wall of the motor house 1 and the inner face of the outer retaining plate 30; the water-resistant pad 24 covers along the border of inner face of the outer retaining plate 30. The water-resistant pad 24 is for preventing water infiltration from outside the motor house 1.

The speed controller 10 includes a circuit board 11 that is provided with a variable resistor 12, a flexible conducting plate 14 and a power connecting point 13. The power connecting point 13 is connected to a power socket through a wire. One end of the flexible conducting plate 14 is connected to the variable resistor 12 through a wire. Controlled by the push button 7, another end of the flexible conducting plate 14 can be connected or disconnected to the power connecting point 13. The variable resistor 12 further includes a wire connected to the motor M, a plurality of conducting ports 120 and a conducting slider 15 having a projection 16. The conducting slider 15 bridges two of the conducting ports 120 so as to define a resistance for the variable resistor 12, and, as it slides up and down, the resistance switches to other values. The variation in resistance provides a control mechanism for changing the rotational speed of the motor M. Further, a slider handle 34 goes through the sliding slots 32, 22 of the outer retaining plate 30 and the inner retaining plate 20, as well as the wavy plate 25, and is connected to the projection 16 of the conducting slider 15 of the variable resistor 12, for actuating a sliding motion of the conducting slider 15 along the variable resistor 12.

The speed controller 10 is locked by a set of screws on the positioning posts 31 of the outer retaining plate 30 under the condition that the positioning posts 31 are coupled with the hollow positioning tubes 21 of the inner retaining plate 20. Thereby, the inner retaining plate 20 and the outer retaining plate 30 are attached respectively onto the inner wall and the outer wall of the motor house 1.

The wavy plate 25 is disposed between the slot 2 on the outer wall of the motor house 1 and the slot 32 on the inner face of the outer retaining plate 30, so as to shield the slot 2 from the invasion of liquid drops and dust from outside.

To use the aforesaid fruit/vegetable blender having a multi-speed control switch, the push button 7 is pushed to connect the power connecting point 13 and the variable resistor 12. The slider handle 34 is then urged to move up and down by which the conducting slider 15 slides along the variable resistor 12 so as to connect two conducting ports 120 corresponding to a desired motor speed. The smaller the resistance of the variable resistor 12, the higher is the motor speed. The motor M rotates a blade set 8 within the food container 80 to mince the fruit/vegetable therein, as shown in FIG. 2.

The present invention has the advantages as follows. The ring groove 5 defined by the ring wall 6 and the outer rim of the base 4 provides a firm engaging structure by which the motor house 1 can be mounted on the base 4. The coupling of the positioning posts 31 and the hollow positioning tubes 21 provides a firm connection of the outer retaining plate 30 and the inner retaining plate 20 with the motor house 1. The speed controller 10 is connected to the positioning posts 31 and the hollow positioning tubes 21, which are non-metallic (plastic) parts, and therefore is electrically insulated. The water-resistant pad 24 pinched between the outer retaining plate 30 and the motor house 1 protects the motor house 1 from water infiltration from outside. The wavy plate 25, capable of extending and contracting along the direction the slot 2 extends, provides a water-resistant effect for the slot 2 of the motor house 1. The multiple speed control mechanism achieved the variable resistor 12 provides many speed options for a user.

What is claimed is:

1. A fruit/vegetable blender having a multi-speed control switch, comprising:
   a motor house made of stainless steel and provided with a slot, a through hole and a plurality of insertion holes on a lateral wall thereof;
   a base provided with a ring-shaped inner wall along the rim of a top side thereof, said inner wall and said rim forming a ring groove for providing a firm engaging mechanism with the bottom side of said motor house;
   an inner retaining plate attached to an inner wall of said motor house and provided with a plurality of hollow positioning tubes, a through hole and a slot, said through hole and said sliding slot respectively corresponding to said slot and said through hole of said motor house;
   an outer retaining plate attached to an outer wall of said motor house and provided with a plurality of solid positioning posts that can be coupled to said hollow positioning tubes of said inner retaining plate, said outer retaining plate further including a through hole and a sliding slot respectively corresponding to said slot and said through hole of said motor house;
   a water-resistant pad sandwiched by said outer wall of said motor house and an inner face of said outer retaining plate, said water-resistant pad covering along the border of said inner face of said outer retaining plate, said water-resistant pad being for protecting said motor house from water infiltration from outside;
   a speed controller including a circuit board that is provided with a variable resistor, a flexible conducting plate and a power connecting point, said power connecting point being connected to a power socket through a wire, one end of said flexible conducting plate being connected to said variable resistor through another wire, said push button controlling the connection of another end of said flexible conducting plate to said power connecting point, said variable resistor further including a wire connected to a motor, a plurality of conducting ports and a conducting slider having a projection, said conducting slider bridging two of said conducting ports so as to define a resistance for said variable resistor, said conducting slider being capable of sliding along said variable resistor to switch said resistance to other values, whereby the variation in said resistance provides a control mechanism for changing the rotational speed of said motor; wherein said speed controller is locked by a set of screws onto the top ends of said positioning posts extending from said outer retaining plate after being coupled with said hollow positioning tubes extending from said inner retaining plate, whereby said inner retaining plate and said outer retaining plate can be respectively attached onto two opposite sides of said lateral wall of said motor house; and
   a wavy plate disposed between said outer wall of said motor house over said slot thereon and said inner face of said outer retaining plate over said sliding slot thereon so as to shield said slot of said motor house from liquid drops and dust from outside;
   a slider handle going through said sliding slots of said outer retaining plate and said inner retaining plate, as well as said wavy plate, and being connected to said projection of said conducting slider of said variable resistor, whereby said slider handle urges a sliding motion of said conducting slider along said variable resistor.

* * * * *